United States Patent [19]
Miyakawa

[11] 3,775,001
[45] Nov. 27, 1973

[54] AUTOMATIC APERTURE CONTROLS FOR MOTION PICTURE CAMERAS

[75] Inventor: Seinan Miyakawa, Tokyo, Japan

[73] Assignee: Asahi Kogaku Kagyo Kabushiki Kaisha, Tokyo, Japan

[22] Filed: Apr. 10, 1972

[21] Appl. No.: 242,531

[30] Foreign Application Priority Data
Apr. 19, 1971 Japan.............................. 46/30361

[52] U.S. Cl................ 352/141, 95/10 CD, 95/64 D
[51] Int. Cl. ............................................. G03b 7/08
[58] Field of Search.................. 352/141; 95/10 CD, 95/64 D

[56] References Cited
UNITED STATES PATENTS
| | | | |
|---|---|---|---|
| 3,554,633 | 1/1971 | Sekine ............................... | 352/141 |
| 3,188,935 | 6/1965 | Lieser ............................ | 352/141 X |
| 3,198,065 | 8/1965 | Bohm............................. | 352/141 X |
| 3,313,224 | 4/1967 | Biedermann.................... | 352/141 X |

Primary Examiner—Monroe H. Hayes
Attorney—Harold D. Steinberg et al.

[57] ABSTRACT

A motion picture camera having automatic controls for setting the aperture. The adjustable diaphragm of the camera is controlled by a reversible adjusting structure which can move in opposed directions one of which enlarges the aperture and the other of which reduces the aperture. The reversible adjusting structure is controlled by way of automatic controls which automatically achieve an aperture which will provide proper film exposure, the controls being regulated according to a number of factors one of which is the light at the object to be photographed. This latter factor is introduced into the controls by way of a light-detecting structure which responds to light at the object and which feeds to the controls a signal in the form of an arithmetic progression, the controls also being regulated according to the speed of the film which is exposed and the rate of film movement in the camera. In addition compensating devices are provided to compensate for the condition where the camera is running and for the condition where the camera is not running.

4 Claims, 2 Drawing Figures

AUTOMATIC APERTURE CONTROLS FOR MOTION PICTURE CAMERAS

BACKGROUND OF THE INVENTION

The present invention relates to cameras.

In particular, the present invention relates to motion picture cameras.

The present invention deals, more particularly, with structures incorporated into motion picture cameras for automatically setting the aperture.

Although there have already been provided various structures for automatically determining the size of the aperture through which light reaches the film in a motion picture camera, all of the known structures suffer from serious drawbacks. Thus, it has already been suggested to provide, as an ideal measure, a so-called feedback system where the diaphragm control mechanism includes a photosensitive element arranged at a location where this element detects part of the light emitted from a photographed object after the light has been deflected away from the main light path by a beam splitter located between the objective and the rotary shutter, with the objective and the shutter both being situated behind a conventional diaphragm which is controlled with the output from the photosensitive element. This type of control has proved to be disadvantageous in practice since light emitted from the photographed object reaches the film and the photosensitive element in a substantially reduced quantity and is subjected to optical aberration, undesirable reflections, and the like, particularly in the case where the beam splitter is constituted by a semi-transparent mirror or the like.

Other proposals have been made, but they all suffer from other drawbacks such as the fact that the amount of light reflected to a light-detecting structure when the camera is not running is far greater than when the camera is running. Although steps have been proposed to avoid this latter drawback, considerable difficulty has been encountered in practice in achieving proper compensation for light detection while the shutter of the camera does not rotate.

SUMMARY OF THE INVENTION

It is accordingly a primary object of the present invention to provide a motion picture camera with a structure which will avoid the above drawbacks.

In particular, it is an object of the invention to provide automatic diaphragm controls which will achieve proper film exposure under a wide variety of operating conditions in a fully automatic manner with a relatively simple structure which operates in a highly effective manner to achieve the desired results.

In particular, it is an object of the invention to provide for the controls of the diaphragm a light-detecting structure capable of feeding to the controls a signal in the form of an arithmetic progression for simplifying the controls and at the same time increasing the accuracy thereof.

In addition it is an object of the invention to provide for automatic control structure of this type a highly effective compensation for the situation where the camera is running and the situation where the camera is not running.

Yet another object of the present invention is to provide controls of the above type which can be used in a highly effective manner not only for taking into consideration the speed of the film which is exposed but also for taking into consideration the number of film frames which are exposed in a unit of time.

According to the invention an adjustable diaphragm means is adjusted by a reversible adjusting means capable of moving on the one hand in an aperture enlarging direction and on the other hand in an opposed aperture reducing direction. A control means coacts with the reversible adjusting means to actuate the latter, and this control means responds to signals one of which is supplied by a light-detecting means for detecting the light at the object to be photographed and for feeding a corresponding signal to the control means. This signal which is fed by the light-detecting means is in the form of an arithmetic progression, and the control means responds to this latter signal as well as other signals such as signals according to the film speed and rate of film movement for automatically actuating the reversible adjusting means to bring about either enlarging or reducing the aperture of the diaphragm means until this aperture has a size which will provide a proper exposure.

BRIEF DESCRIPTION OF DRAWINGS

The invention is illustrated by way of example in the accompanying drawings which form part of this application and in which.

DESCRIPTION OF PREFERRED EMBODIMENTS

Figure 1:
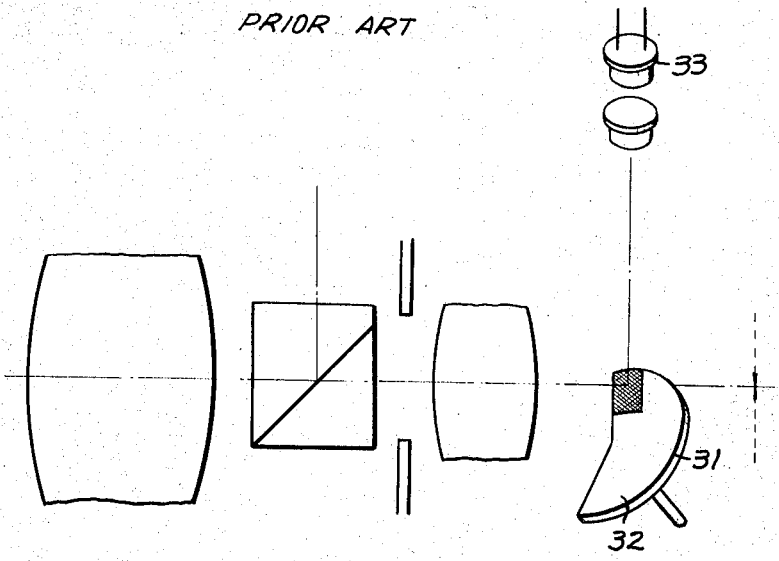
FIG. 1 is a schematic representation of a known structure of the prior art.

An example of the problems encountered with the prior art is illustrated schematically in FIG. 1. Thus, FIG. 1 schematically illustrates the rotary shutter 31 in the form of a circular plate having a sector-shaped cutout as is well known. The surface 32 of the rotary shutter 31 which is directed toward the objective receives a light which is reflected from the surface 32 and which is measured for the purpose of achieving a diaphragm control. Thus, light travelling from the object which is photographed is reflected from the surface 32, as schematically shown in FIG. 1, so as to be received by a photosensitive element 33. Reflection of light to the photosensitive element 33 takes place while film is transported in the camera since at this time the rotary shutter 31 prevents light from reaching the film, and, as is well known, when the film is stationary the cutout of the shutter is in alignment with the optical axis so that an exposure is made, after which the shutter 31 during its continued rotation again blocks travel of light to the film which is transported to situate the next frame in a position for exposure, and it is during this latter film transportation operation that light is reflected by the surface 32 of the shutter 31 to the photosensitive element 33.

The result of this type of operation is that light from the object which is photographed is reflected to the photosensitive element in an intermittent manner during rotation of the shutter 31. The amount of this intermittent light which impinges on the photosensitive element during a given unit of time is only a fraction of the amount which is incident upon the film surface. Moreover, when the shutter stops rotating, the amount of light received by the photosensitive element increases up to several times the amount which is received during rotation of the shutter while the camera is running. In order to compensate for the differences in the amount of light received by the photosensitive element on the one hand while the shutter is rotating and on the other hand while the shutter is not rotating, it has been suggested that a compensating filter be provided in front of the photosensitive element with a suitable structure being connected to the filter in order to insert the latter into the path of light to the photosensitive element and remove it from this path of light in synchronism with the stopping and starting of the camera. It has also been proposed that that portion of the surface 32 which receives light when the shutter does not rotate be provided with a filter or grating which will lower the reflection factor, as compared with the remainder of the reflecting surface of the shutter. However, light which comes from the object to be photographed varies widely, and other variables must be taken into consideration, these variables including the speed of the film which is exposed, the shutter speed, and the angle of the sector-shaped opening in the shutter, so that it is almost impossible to adjust the photosensitive element 33 and elements associated therewith such as an indicator instrument, in accordance with the actual incidence of light which varies from moment to moment as pointed out above.

These drawbacks are avoided with the present invention basically by providing a diaphragm adjusting means in the form of a servomotor mechanism which serves to drive the adjustable diaphragm and which is under the control of detection of light by a light-detecting means which includes a photosensitive element and a log-conversion element in the form of a diode which is connected in series with the photosensitive element, with the factors required to be taken into consideration for achieving proper photographs being preset according to the particular requirements.

Figure 2:
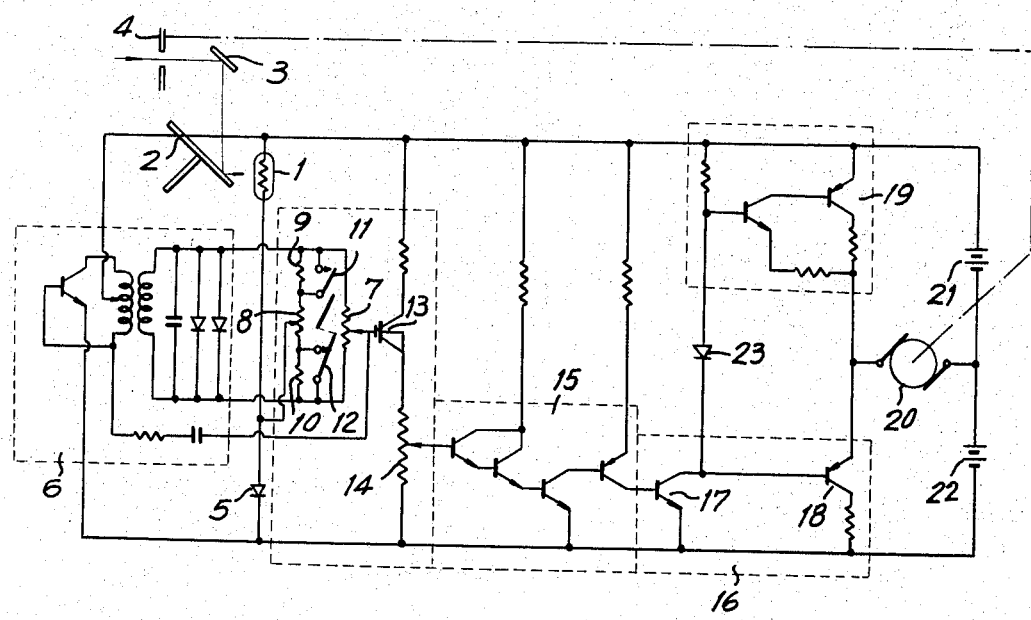
FIG. 2 is a schematic representation of an embodiment according to the present invention.

Referring to FIG. 2, there is illustrated therein a photosensitive element 1 which forms part of the light-detecting means. This photosensitive element 1 is situated in the path of light rays travelling from the object which is photographed. After these light rays pass through the objective they travel through the aperture formed by the adjustable diaphragm means 4, and then the light is reflected by a mirror 3 so as to reach the reflecting surface of the rotary shutter 2 which has a sector-shaped exposure cutout as is well known.

The light-detecting means includes, in addition to the photosensitive means 1, a diode 5 acting as a log-conversion element and connected in series with the photosensitive means 1 so as to form therewith an object luminance data detector section.

The circuitry of FIG. 2 includes a source for an AC signal, this source 6 taking the form of a DC-DC converter mechanism which serves as an auxiliary power source. This auxiliary power source 6 has an output terminal to which is connected a means for introducing into the control means factors which must be taken into consideration to achieve proper photographs. Thus, this structure connected to the output terminal of the auxiliary power source 6 includes a potentiometer 7 having its resistance value regulated according to the selected rate of film movement in the camera. Thus the camera can be adjusted to expose a selected number of frames per unit of time, and in accordance with this selection the potentiometer 7 is set at a corresponding resistance value. Also, the means for introducing exposure determining factors includes a potentiometer 8 the resistance value of which is set according to the speed of the film which is exposed in the camera. These potentiometers 7 and 8 are connected in parallel at the output side of the converter means 6.

The circuitry also includes means to compensate for the condition where the camera is operating and a condition where the camera is not operating. This compensating means includes the resistors 9 and 10 which have a common resistance value and between which the potentiometer 8 is connected so that the compensating resistors are connected in series with the potentiometer 8 at the opposed ends of the latter. A switch means 11, 12 is provided for alternately rendering the compensating resistors operative. Thus, switch means 11, 12 includes a switch 11 cooperating with the resistor 9 and a switch 12 cooperating with the resistor 10. When the switch 11 is closed the switch 12 is open and when the switch 12 is closed the switch 11 is open. As is apparent from FIG. 2, closing of switch 11 will render resistor 9 ineffective since it will be bypassed by the switch 11, while opening of switch 11 will render the resistor 9 operative. In the same way, closing of the switch 12 renders resistor 10 inoperative while opening of the switch 12 places the resistor 10 in an operative condition in the circuit.

These resistors are controlled by the switch means 11, 12 in such a way that one of the resistors is operative when the camera is not running, which is to say when the shutter 2 does not rotate, while the other resistor is operative when the camera is operating and the shutter 2 is rotating. The circuitry is shown in FIG. 2 in the condition it has when there is an interruption in the photographing of the object and the shutter 2 is stationary. At this time the switch 11 is open while the switch 12 is closed, so that the resistor 10 is placed in an inoperative condition while the resistor 9 is operative at this time to provide the compensation required when the shutter is stationary. It is possible to interchange the illustrated locations of the potentiometers 7 and 8, but in this case there must be a compensating resistor to take care of the condition of the circuit.

The data output terminal of the light-detecting means formed by the object luminance data detector section made up of components 1 and 5 is formed by the junction between series-connected components 1 and 5, this junction being electrically connected to the slidable terminal of the potentiometer 8 which is adjusted in accordance with the speed of the film which is exposed. The slidable terminal of the potentiometer 7 is placed at a position corresponding to the selected number of film frames which are exposed in the unit of time, and this latter slidable terminal is electrically coupled to the control electrode of a switching transistor 13 which forms part of the control means of the invention.

The switching transistor 13 is in turn connected in series to batteries 21 and 22 which serve as the primary power source, so that AC signals from the DC—DC converter mechanism 6 are applied to the control electrode of switching transistor 13 as a control data input terminal of the switching mechanism serving in this way to regulate the control means so as to operate in a controlled manner the reversible adjusting means which is formed by the servomotor 20 as described in greater detail below.

The illustrated circuitry of the invention includes a third potentiometer 14 connected in series with the output terminal of transistor 13 and a switching performance amplifier section 15 is connected to the slidable terminal of potentiometer 14. The amplifier 15 is in turn connected to a Darlington circuit 16 which includes two transistors 17 and 18 serving as a circuit for bringing about a reverse rotation of servomotor 20 which is to say an operation of the reversible adjusting means 20 in an aperture-reducing direction. Thus, at this time the servomotor 20 by its operative connection with the adjustable diaphragm means 4, as schematically shown in FIG. 2, will bring about a reduction in the size of the aperture. The base electrode of transistor 17 is coupled to the output terminal of the switching performance amplifier section 15.

A control circuit 19 is provided to bring about forward rotation of the servomotor 20, which is to say operation of the reversible diaphragm adjusting means 20 in a direction which increases the aperture size. The input terminal of the circuit 19 is connected through the positive side of battery 21 which serves as the primary power source and diode 23 in a forward direction with respect to the positive electrode of battery 21 to the collector electrode of transistor 17 while the output terminals of the circuits 16 and 19 for bringing about the different directions of rotation of the servomotor mechanism are connected to a common junction.

As pointed out above, the switching mechanism which controls the operation of the reversible adjusting means 20 includes the switching transistor 13, the switching performance amplifier section 15, the circuit 19 for operating adjusting means 20 in an aperture-enlarging direction and the circuit 16 for operating the adjusting means 20 in an aperture-reducing direction. The servomotor 20 which forms the reversible adjusting means is connected between the common junction of the outputs of the circuits 16 and 19 and the junction between the series-connected batteries 21 and 22, and through suitable connection to the diaphragm 4 the servomotor 20 will bring about an enlargement or reduction in the size of the aperture.

The operation of the above-described structure of the invention is as follows:

Prior to exposure of film, the resistance value of potentiometer 7 is set in accordance with the selected number of film frames to be exposed in a unit of time in the camera. Also, the potentiometer 8 is set according to the speed of the film which is exposed. The actual exposure of the film begins with the latter preset values and with the camera directed toward the object which is to be photographed.

Assuming that the aperture of the diaphragm means 4 is not proper for the particular photographing requirements in accordance with the light at the object to be photographed, for example, then it will be necessary to change the size of the aperture. If it is assumed that too much light is transmitted so that overexposure of the film would result unless the aperture is reduced, then the structure operates to effectively reduce the size of the aperture. At this time the light which comes from the object to be photographed is reflected by the reflecting surface of the rotary shutter 2 which rotates at a velocity which is determined by the setting of the potentiometer 7. In other words when the potentiometer 7 is adjusted there is simultaneously an adjustment of the number of frames which will be exposed by the camera during each unit of time. Thus the speed of rotation of the shutter 2 is matched with the setting of the potentiometer 7. The light from the object is reflected by the rotating shutter 2 to the photosensitive means 1 which together with the log-conversion element 5 converts the light into a voltage signal which varies in the form of an arithmetic progression in accordance with the light received from the object which is photographed. The output signal from the light-detecting means 1, 5, which is thus obtained in this manner, is transmitted to the control means for bringing about the required controls.

At this time, since the camera is operating, the reciprocal change-over switching mechanism 11, 12 is in a position where the switch 11 is closed and the switch 12 is open, so that at this time the resistor 10 is in an operative condition while the resistor 9 is in an inoperative condition.

The output signal achieved in the above manner from the data detector section which forms the light-detecting means is applied to the mechanism which adds together and feeds the signals according to the photographing requirements to the control means. The voltage at the control electrode of transistor 13 of the switching mechanism at this time rises and the transistor 13 is transferred into a state of continuity or conductivity. As a result the switching performance amplifier section 15 is also in a state of continuity or conductivity, and the circuit 16 for reverse rotation of servomotor 20 is also in a state of continuity or conductivity while the circuit 19 for forward rotation of the servomotor is in a state of discontinuity or non-conductivity, so that at this time closed circuit is established by the battery 22, the servomotor mechanism 20, the transistor 18, and the opposed terminal of the battery 22, so that the reversible adjusting means 20 is now operated by the control means in an aperture-reducing direction.

As a result the diaphragm means 4 is automatically driven so as to reduce the size of the aperture and thus reduce the light coming from the object to be photographed into the camera. Consequently, the light which impinges on the photosensitive means 1 is reduced, and therefore the output from the data detector section or light-detecting means 1, 5 correspondingly is reduced until the section which adds the requirement factors together in the circuit for controlling the means 13 assumes a state of balanced voltage as determined by the controls achieved from the setting of the potentiometer 7, the setting of the potentiometer 8, the compensating resistor 10 and the signal from the light-detecting means 1, 5. All of these latter factors are transmitted to the control means 13 for regulating the operation thereof. When this balanced condition is reached the input signal to the control electrode of the switching transistor 13 consists only of the AC signal from the DC-DC converter means 6 which serves as the auxiliary power source. When this state of operation is achieved, an amplified signal is generated in the switching mechanism, rapidly stopping the rotation of servomotor 20 in the aperture-reducing direction, and resulting in termination of the adjustment of the diaphragm means 4 when the latter reaches a position providing an aperture which is the best possible aperture for exposure of the film under the conditions which are encountered, these conditions of course including the condition of the light at the object which is photographed.

Assuming now that when the camera operation is started the aperture provided by the adjustable diaphragm means 4 is too small so that insufficient light reaches the film, then the above structure of the invention will operate in such a way that the control electrode of transistor 13 transfers to a negative potential as a result of the negative voltage output from the light-detecting means or data detector section 1, 5, so that at this time the transistor 13 is held in a state of perfect continuity. Therefore, only the circuit 19 for bringing about rotation of the servomotor 20 in a direction which will enlarge the aperture is in a state of continuity at that part of the circuitry which follows the transistor 13, since the transistor 13 at this time cannot transmit any signal to the amplifier 15 or the circuit 16. Therefore at this time only the circuit 19 operates to actuate the adjusting means 20 in order to bring about a drive of the diaphragm means 4 in the aperture-enlarging direction. Now the size of the aperture will increase until it reaches a state which is optimum for the particular photographing requirements. As the light coming from the photographed object to the photosensitive member increases, the control electrode of the transistor 13 again approaches toward the positive potential, and finally the rotation of servomotor 20 in the aperture-increasing direction stops at the time when only AC signal is provided from the DC-DC converter means and applied to the control electrode. Thereafter proper photographing is continued under the controls as described above.

As is apparent from the above description, with the present invention the switching mechanism which forms the control means is regulated in accordance with the photographing requirements which are added to each other to achieve the required regulation of the control means, these requirements being the film speed, the rate of film movement, and the light received by the light-detecting section. This section which regulates the control means 13 is itself under the control of the DC-DC converter mechanism which serves as the auxiliary power source, with the potentiometer 8 being set according to the film speed while the potentiometer 7 is set according to the rate of film movement, and both of these factors are added so as to bring about proper regulation of the controls to achieve proper photographs with the aperture of the diaphragm means automatically situated at the best possible size for achieving in a fully automatic manner the best possible photographs under the particular photographing conditions which are encountered.

The reciprocal change-over switching mechanism 11, 12 in the section which adds together the photographing requirements is operatively connected with the structure of the camera which releases the camera for operation so that through this structure it is possible to provide an automatic compensation at the output of the light-detecting means which is reliably compensated to take care of the situation where the shutter 2 would otherwise transmit too much light from the object to the photosensitive means 1 where the photographing operations are interrupted.

A further important feature of the invention resides in the fact that the photosensitive means 1 and the diode 5 are connected in series in such a way that the output of this detector section varies in the form of an arithmetic progression which is applied in a linear manner on the voltage outputs of the potentiometers 7 and 8, at the following stage, so as to enable the output signal from the object luminance data detector section to correspond perfectly to the output signal from the requirement adding section. Thus the structure of the invention achieves a high efficiency and is highly practical while at the same time having a relatively simple structure.

What is claimed is:

1. In a motion picture camera, adjustable diaphragm means, reversible adjusting means operatively connected with said adjustable diaphragm means for adjusting the latter, said reversible adjusting means being operable in an aperture-enlarging direction for increasing the aperture of said adjustable diaphragm means and an opposed aperture-reducing direction of operation for reducing the aperture of the adjustable diaphragm means, control means operatively connected with said reversible adjusting means for operating the latter in one or the other of said directions of operation until said reversible adjustable means places said diaphragm means in a position where proper film exposure takes place, and light-detecting means operatively connected with said control means for detecting the condition of light at the object which is photographed and for influencing said control means to actuate said reversible adjusting means to achieve proper film exposure in accordance with light at the object which is photographed, said light-detecting means including a photosensitive means for receiving light and converting the latter into an electrical quantity and a log-conversion diode connected in series with said photosensitive means, said diode and photosensitive means being electrically coupled with said control means for influencing the latter according to the lighting conditions, a converter means being electrically connected with said control means for feeding an AC signal to the latter for terminating the operation of said reversible adjusting means precisely when said diaphragm means is in a position where proper film exposure takes place.

2. In a motion picture camera, adjustable diaphragm means, reversible adjusting means operatively connected with said adjustable diaphragm means for adjusting the latter, said reversible adjusting means being operable in an aperture-enlarging direction for increasing the aperture of said adjustable diaphragm means and an opposed aperture-reducing direction of operation for reducing the aperture of the adjustable diaphragm means, control means operatively connected with said reversible adjusting means for operating the latter in one or the other of said directions of operation until said reversible adjustable means places said diaphragm means in a position where proper film exposure takes place, and light-detecting means operatively connected with said control means for detecting the condition of light at the object with is photographed and for influencing said control means to actuate said reversible adjusting means to achieve proper film exposure in accordance with light at the object which is photographed, said control means including a transistor and a pair of circuits operatively connected between the latter and said reversible adjusting means for responding to the operation of said transistor for operating said reversible adjusting means in one direction or the other, a pair of potentiometers connected in parallel with each other and to said transistor for respectively controlling the latter according to the factor of the speed of film movement and the speed of the film, and a converter means operatively connected with said transistor for feeding an AC signal thereto, for terminating operation of said reversible adjusting means precisely when said diaphragm means is in a position where proper film exposure takes place.

3. The combination of claim 2 and wherein said control means further includes a pair of compensating resistors both connected in series with one of said potentiometers and a reversible switch means electrically connected operatively with said resistors for rendering one of said resistors operative when the camera runs and the other of said resistors operative when the camera does not run, said resistors compensating for light received while the camera is running and while the camera is not running, respectively.

4. The combination of claim 3 and wherein said light-detecting means includes a rotary shutter which reflects light after the light has passes through the diaphragm, a photosensitive element for receiving the reflected light and converting the latter into an electrical quantity and a diode connected to said photo-sensitive element and to said transistor, said photosensitive element and diode influencing said transistor according to an arithmetic progression.

* * * * *